US010958627B2

(12) United States Patent
Menachem et al.

(10) Patent No.: US 10,958,627 B2
(45) Date of Patent: Mar. 23, 2021

(54) OFFLOADING COMMUNICATION SECURITY OPERATIONS TO A NETWORK INTERFACE CONTROLLER

(71) Applicant: Mellanox Technologies, Ltd., Yokneam (IL)

(72) Inventors: Adi Menachem, Hod Hasharon (IL); Liran Liss, Atzmon (IL); Boris Pismenny, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/858,874

(22) Filed: Apr. 27, 2020

(65) Prior Publication Data

US 2020/0259803 A1 Aug. 13, 2020

Related U.S. Application Data

(62) Division of application No. 15/841,339, filed on Dec. 14, 2017, now Pat. No. 10,708,240.

(51) Int. Cl.
*H04L 29/06* (2006.01)
*G06F 21/60* (2013.01)
(Continued)

(52) U.S. Cl.
CPC ...... *H04L 63/0428* (2013.01); *G06F 9/45558* (2013.01); *G06F 21/53* (2013.01); *G06F 21/602* (2013.01); *H04L 9/0897* (2013.01); *H04L 9/14* (2013.01); *H04L 9/3226* (2013.01); *H04L 63/0485* (2013.01); *H04L 63/164* (2013.01); *G06F 9/45533* (2013.01);
(Continued)

(58) Field of Classification Search
None
See application file for complete search history.

(56) References Cited

U.S. PATENT DOCUMENTS 9,038,073 B2 5/2015 Kohlenz et al.
9,678,818 B2 6/2017 Raikin et al.
(Continued)

OTHER PUBLICATIONS

U.S. Appl. No. 16/202,132 office action dated Apr. 2, 2020.
(Continued)

*Primary Examiner* — Jeffery L Williams
(74) *Attorney, Agent, or Firm* — Kligler & Associates Patent Attorneys Ltd (57) ABSTRACT

Computing apparatus includes a host processor, which runs a virtual machine monitor (VMM), which supports a plurality of virtual machines and includes a cryptographic security software module. A network interface controller (NIC) links the host processor to a network so as to transmit and receive data packets from and to the virtual machines and includes a cryptographic security hardware logic module, which when invoked by the VMM, applies the cryptographic security protocol to the data packets while maintaining a state context of the protocol with respect to each of the virtual machines. Upon encountering an exception in applying the cryptographic security protocol, the NIC transfers the data packet, together with the state context of the cryptographic security protocol with respect to the given virtual machine, to the cryptographic security software module for processing.

9 Claims, 4 Drawing Sheets

(51) Int. Cl.
    *G06F 21/53* (2013.01)
    *H04L 9/08* (2006.01)
    *G06F 9/455* (2018.01)
    *H04L 9/14* (2006.01)
    *H04L 9/32* (2006.01)

(52) U.S. Cl.
    CPC ............. *G06F 2009/45587* (2013.01); *G06F 2009/45595* (2013.01); *H04L 2209/12* (2013.01)

(56) References Cited

U.S. PATENT DOCUMENTS

| | | | |
|---|---|---|---|
| 10,120,832 B2 | 11/2018 | Raindel et al. | |
| 10,152,441 B2 | 12/2018 | Liss et al. | |
| 10,210,125 B2 | 2/2019 | Burstein | |
| 10,218,645 B2 | 2/2019 | Raindel et al. | |
| 10,353,722 B2* | 7/2019 | Karino | G06F 9/5044 |
| 10,423,774 B1* | 9/2019 | Zelenov | G06F 21/445 |
| 2004/0039940 A1 | 2/2004 | Cox et al. | |
| 2005/0198412 A1* | 9/2005 | Pedersen | H04L 63/0428 |
| | | | 710/30 |
| 2006/0095754 A1* | 5/2006 | Hyder | G06F 9/5027 |
| | | | 713/1 |
| 2006/0104308 A1* | 5/2006 | Pinkerton | H04L 63/0485 |
| | | | 370/469 |
| 2008/0147822 A1 | 6/2008 | Benhase et al. | |
| 2008/0271134 A1* | 10/2008 | Johnson | H04L 63/02 |
| | | | 726/13 |
| 2008/0313364 A1 | 12/2008 | Flynn et al. | |
| 2009/0106771 A1 | 4/2009 | Benner et al. | |
| 2009/0319775 A1* | 12/2009 | Buer | H04L 63/0428 |
| | | | 713/153 |
| 2009/0328170 A1* | 12/2009 | Williams | G06F 21/41 |
| | | | 726/7 |
| 2011/0246597 A1 | 10/2011 | Swanson et al. | |
| 2013/0276133 A1* | 10/2013 | Hodges | G06F 21/60 |
| | | | 726/27 |
| 2014/0129741 A1 | 5/2014 | Shahar et al. | |
| 2014/0282050 A1* | 9/2014 | Quinn | G06F 3/0481 |
| | | | 715/744 |
| 2014/0282561 A1 | 9/2014 | Holt et al. | |
| 2015/0347185 A1 | 12/2015 | Holt et al. | |
| 2015/0355938 A1 | 12/2015 | Jokinen et al. | |
| 2016/0132329 A1 | 5/2016 | Gupte et al. | |
| 2017/0075855 A1 | 3/2017 | Sajeepa et al. | |
| 2017/0180273 A1* | 6/2017 | Daly | H04L 69/22 |
| 2017/0264622 A1* | 9/2017 | Cooper | G06F 21/606 |
| 2017/0371835 A1 | 12/2017 | Ranadive et al. | |
| 2018/0067893 A1 | 3/2018 | Raindel et al. | |
| 2018/0114013 A1 | 4/2018 | Sood et al. | |
| 2018/0167364 A1* | 6/2018 | Dong | H04L 49/00 |
| 2018/0210751 A1* | 7/2018 | Pepus | H04L 63/0209 |
| 2018/0246768 A1 | 8/2018 | Palermo et al. | |
| 2018/0262468 A1* | 9/2018 | Kumar | H04L 63/0281 |
| 2018/0285288 A1* | 10/2018 | Bernat | G06F 12/0831 |
| 2019/0026157 A1 | 1/2019 | Suzuki et al. | |
| 2019/0081904 A1* | 3/2019 | Bohrer | G06F 9/45558 |
| 2019/0116127 A1 | 4/2019 | Pismenny et al. | |
| 2019/0163364 A1 | 5/2019 | Gibb et al. | |
| 2019/0173846 A1* | 6/2019 | Patterson | G06F 9/45545 |
| 2019/0190892 A1* | 6/2019 | Menachem | G06F 21/53 |
| 2019/0250938 A1* | 8/2019 | Claes | G06F 9/45533 |
| 2020/0012604 A1 | 1/2020 | Agarwal | |
| 2020/0026656 A1 | 1/2020 | Liao et al. | |
| 2020/0401440 A1 | 12/2020 | Sankaran et al. | |

OTHER PUBLICATIONS

U.S. Appl. No. 16/159,767 Office Action dated Oct. 1, 2020.
European Application # 201668019 search report dated May 29, 2020.
Burstein, "Enabling Remote Persistent Memory", SNIA-PM Summit, pp. 1-24, Jan. 24, 2019.
Chung et al., "Serving DNNs in Real Time at Datacenter Scale with Project Brainwave", IEEE Micro Pre-Print, pp. 1-11, Mar. 22, 2018.
Talpey, "Remote Persistent Memory—With Nothing But Net", SNIA-Storage developer conference, pp. 1-30, 2017.
Microsoft, "Project Brainwave", pp. 1-5, year 2019 https://www.microsoft.com/en-us/research/project/project-brainwave/.
U.S. Appl. No. 16/827,912 office action dated Jan 1, 2021.

* cited by examiner

OFFLOADING COMMUNICATION SECURITY OPERATIONS TO A NETWORK INTERFACE CONTROLLER

The present application is a Divisional application of U.S. Ser. No. 15/841,339, filed on 14 Dec. 2017 and entitled "OFFLOADING COMMUNICATION SECURITY OPERATIONS TO A NETWORK INTERFACE CONTROLLER"

FIELD OF THE INVENTION

The present invention relates generally to computer network communications, and particularly to apparatus and methods for performing security-related operations on data packets transmitted and received over a network.

BACKGROUND

Internet Protocol Security (IPsec) is a network protocol suite that authenticates and encrypts data packets sent over a network. IPsec operates the Internet Layer (referred to generically as the network layer, or Layer 3) of the Internet Protocol (IP) suite, and can automatically secure applications and data transmitted in IP packets. IPsec uses cryptographic security services to support network-level peer authentication, data-origin authentication, data integrity, data confidentiality (encryption), and replay protection. IPsec also includes protocols for establishing mutual authentication between agents at the beginning of the session and negotiation of cryptographic keys for use during the session. The IPsec architecture and operational features are specified in a series of Requests for Comments (RFCs) published on line by the Internet Engineering Task Force (IETF), include RFC 4301, RFC 4303, and RFC 4106.

Specific features of IPsec that are used in popular implementations include the following:

- Authentication Headers (AH) are added to IPsec packets to provide connectionless data integrity and data origin authentication for IP datagrams, along with protection against replay attacks. The AH contains a 32-bit sequence number and an integrity check value. To protect against replay attacks, the sequence number is never reused in a given Security Association, and when it reaches its maximum value, a new Security Association is negotiated.
- Encapsulating Security Payload (ESP) is an encrypted payload format that provides confidentiality, data-origin authentication, connectionless integrity, an anti-replay service, and limited traffic-flow confidentiality. In Tunnel Mode, the entire original IP packet is encapsulated with a new packet header added, and ESP protection is applied to the whole inner IP packet (including the header), while an outer header for network routing remains unprotected.
- Security Associations (SA) provide the algorithms and data that are used in deriving and negotiating the parameters necessary for AH and/or ESP operations between a pair of IPsec endpoints. A security association database (SAD) defines the parameters associated with each SA.

Because IPsec is computation-intensive, some authors have suggested offloading IPsec processing from the host processor to a network interface controller (NIC). For example, U.S. Pat. No. 8,006,297 describes a method and system for combined security protocol and packet filter offload and onload. This patent describes a NIC that includes a security association database (SADB) comprising a plurality of security associations (SAs), a cryptographic offload engine configured to decrypt a packet using one of the plurality of SAs, a security policy database (SPD) comprising a plurality of security policies (SPs) and a plurality of filter policies, and a policy engine configured to determine an admittance of the packet using one of the plurality of SPs from the SPD and apply one of the plurality of filter policies to the packet.

As another example, U.S. Patent Application Publication 2010/0228962 describes offloading cryptographic protection processing of packet data sent according to a security protocol between a first computer and a second computer via a forwarding device. The forwarding device performs a portion of the processing, and forwards the packet data to a third computer, connected to the forwarding device, for other processing. The third computer may support non-standard extensions to the security protocol, such as extensions used in authorizing and establishing a connection over the secure protocol. The third computer sends the results of its processing, such as a cryptographic key, or a detected access control policy, to the forwarding device.

SUMMARY

Embodiments of the present invention that are described hereinbelow provide improved apparatus and methods for offload of security-related functions to hardware logic.

There is therefore provided, in accordance with an embodiment of the invention, computing apparatus, including a host processor, which is configured to run a virtual machine monitor (VMM), which supports a plurality of virtual machines running on the host processor, and which includes a cryptographic security software module configured to apply a cryptographic security protocol to data packets transmitted and received by one or more of the virtual machines. A network interface controller (NIC) is configured to link the host processor to a network so as to transmit and receive the data packets from and to the virtual machines over the network, and includes a cryptographic security hardware logic module, which is configured, when invoked by the VMM, to apply the cryptographic security protocol to the data packets transmitted and received by the one or more of the virtual machines while maintaining a state context of the cryptographic security protocol with respect to each of the one or more of the virtual machines. The NIC is configured, upon encountering an exception in applying the cryptographic security protocol to a data packet directed to a given virtual machine, to transfer the data packet, together with the state context of the cryptographic security protocol with respect to the given virtual machine, to the cryptographic security software module of the VMM, which processes the data packet using the state context and passes the data packet, after processing, to the given virtual machine.

In the disclosed embodiments, the VMM is configured to apply the cryptographic security protocol and to invoke the cryptographic security hardware logic module without involvement by the virtual machines in invocation or implementation of the cryptographic security protocol.

In some embodiments, the VMM is configured, when the NIC has encountered the exception, to acquire the state context of the cryptographic security protocol with respect to the given virtual machine by performing a predefined handshake with the NIC. The predefined handshake includes, for example, querying and receiving packet sequence number information from the NIC and updating replay protection information used in the cryptographic security protocol.

In one embodiment, the exception includes a fragmentation of the data packet following application of the cryptographic security protocol by a sender of the data packet, and wherein the VMM is configured to defragment the data packet.

In a disclosed embodiment, the VMM is configured, after processing the data packet, to pass the processed data packet to the given virtual machine by looping the processed data packet through the NIC to the given virtual machine.

In some embodiments, the NIC is configured to apply an encapsulation, using the state context of the cryptographic security protocol, to the data packets transmitted from the given virtual machine to a specified destination, while maintaining a count of the data transmitted using the state context, and when the count reaches a predefined limit, to stop transmitting the data packets to the specified destination and transfer the state context to the cryptographic security software module of the VMM for update of the state context. Additionally or alternatively, the NIC is configured to apply a decapsulation, using the state context of the cryptographic security protocol, to encapsulated data packets received from the network, and upon receiving instructions from the VMM to terminate the decapsulation, to loop the received data packets back to the network.

In an example embodiment, the cryptographic security protocol includes an IPsec protocol.

There is also provided, in accordance with an embodiment of the invention, computing apparatus, including a network interface, configured to be connected to a network, and a host interface, configured to be connected to a peripheral component bus of a host computer. An embedded controller is configured to run a cryptographic security software module, which applies a cryptographic security protocol to data packets transmitted and received by applications running on the host computer. Packet processing hardware logic is coupled between the host interface and the network interface so as to transmit and receive data packets over the network from and to the applications running on the host computer, and includes a cryptographic security hardware logic module, which is configured, when invoked by the embedded controller, to apply the cryptographic security protocol to the data packets transmitted and received by one or more of the applications while maintaining a state context of the cryptographic security protocol with respect to each of the one or more of the applications. The packet processing hardware logic is configured, upon encountering an exception in applying the cryptographic security protocol to a data packet directed to a given application, to transfer the data packet, together with the state context of the cryptographic security protocol with respect to the given application, to the cryptographic security software module of the embedded controller, which processes the data packet using the state context and passes the data packet, after processing, to the given application.

In the disclosed embodiments, the embedded controller is configured to apply the cryptographic security protocol and to invoke the cryptographic security hardware logic module without involvement by the applications in invocation or implementation of the cryptographic security protocol.

There is additionally provided, in accordance with an embodiment of the invention, a method for computing, which includes running on a programmable processor a cryptographic security software module configured to apply a cryptographic security protocol to data packets transmitted and received by applications running on a host computer. A network interface controller (NIC) is coupled between the host processor and a network so as to transmit and receive the data packets from and to the applications over the network. The cryptographic security software module invokes a cryptographic security hardware logic module in the NIC, thereby causing to the cryptographic security hardware logic module to apply the cryptographic security protocol to the data packets transmitted and received by one or more of the applications while maintaining a state context of the cryptographic security protocol with respect to each of the one or more of the applications. Upon encountering in the cryptographic security hardware logic module an exception in applying the cryptographic security protocol to a data packet directed to a given application, the data packet is transferred, together with the state context of the cryptographic security protocol with respect to the given application, to the cryptographic security software module running on the programmable processor. The data packet is processed on the programmable processor using the state context and the cryptographic security software module, which passes the data packet, after the processing, to the given application.

The present invention will be more fully understood from the following detailed description of the embodiments thereof, taken together with the drawings in which:

DETAILED DESCRIPTION OF EMBODIMENTS

Overview

In view of the heavy computational burden involved in cryptographic security protocols, such as IPsec, offloading the processing tasks to a NIC is a desirable solution. The core computational functions of protocols such as IPsec can be implemented efficiently in a cryptographic security hardware logic module, which can be designed in such a way that the necessary packet processing is performed without reducing the data throughput of the NIC.

Almost every protocol, however, has its exceptions, which fall outside the core logical functions. In IP networks, for example, packets to which an AH or ESP was applied at the sending node may be fragmented into smaller packets on the way to their destination. The receiving node must first defragment these packets before AH authentication and decapsulation. Implementing this sort of defragmentation in the NIC requires substantial amounts of memory and reordering logic, which increase chip size and processing latency.

As another example, for reasons of replay protection, IPsec requires that a given SA context be used for no more than a certain number of packets or volume of data. The IPsec endpoints are supposed to maintain a count of data transmitted using the current SA, and then negotiate a new SA when the count reaches a predefined limit. In this case, too, implementing this sort of functionality in hardware logic in the NIC is impractical.

One solution to the sorts of problems described above is for the NIC simply to drop packets when exceptions occur and rely on higher-level software to recover and invoke retransmission when needed. These sorts of solutions generally require that the software applications that transmit and receive the packets be aware of and involved in the cryptographic security protocol. This software involvement adds to the processing burden that is imposed on the CPU, as well as increasing packet latency and reducing throughput.

Embodiments of the present invention that are described herein address these problems by means of a novel collaboration between a cryptographic security hardware logic module in the NIC and a cryptographic security software module running on a processor in a privileged domain. The domain is "privileged" in that it has access to and is able to make changes in the state context of the cryptographic security protocol, wherein this context includes parameters that are used in encryption and authentication, such as packet sequence numbers, counters, and cryptographic keys. Examples of such privileged domains, as illustrated in the embodiments described below, include a virtual machine monitor (VMM, also referred to as the hypervisor) in a host computer running virtual machines, or an embedded programmable controller in a smart NIC. The privileged software module is able to apply the cryptographic security protocol and to invoke the cryptographic security hardware logic module without involvement by the (non-privileged) user-domain applications that transmit and receive the packets via the NIC. In fact, the user-domain applications need not even be aware that packet encryption or authentication is being applied to the packets that they transmit and receive.

In the disclosed embodiments, when cryptographic security is to be applied to data packets transmitted and received by one or more applications (including applications running on a given virtual machine), the cryptographic security software module invokes the cryptographic security hardware logic module in the NIC. The hardware logic module will then apply the appropriate security operations to the data packets transmitted and received by these applications, while maintaining the state context of the cryptographic security protocol with respect to each of the applications in question. When the security hardware logic module encounters an exception in applying the cryptographic security protocol to a data packet directed to a given application, such as a fragmented packet, it transfers the data packet, together with the applicable state context, to the cryptographic security software module. This software module processes the data packet, using the state context, and passes the processed data packet to the appropriate application.

The embodiments that are described below relate specifically, for the sake of clarity and concreteness, to IPsec encryption, authentication and encapsulation. The principles of the present invention, however, are by no means limited to IPsec and may alternatively be applied in implementing other cryptographic security protocols that are known in the art, particularly datagram-based packet encryption, authentication and encapsulation protocols. Examples of such protocols include Media Access Control Security (MACsec), as defined by IEEE standard 802.1AE, and Datagram Transport Layer Security (DTLS), specified in RFC 4347.

System Description

Figure 1:
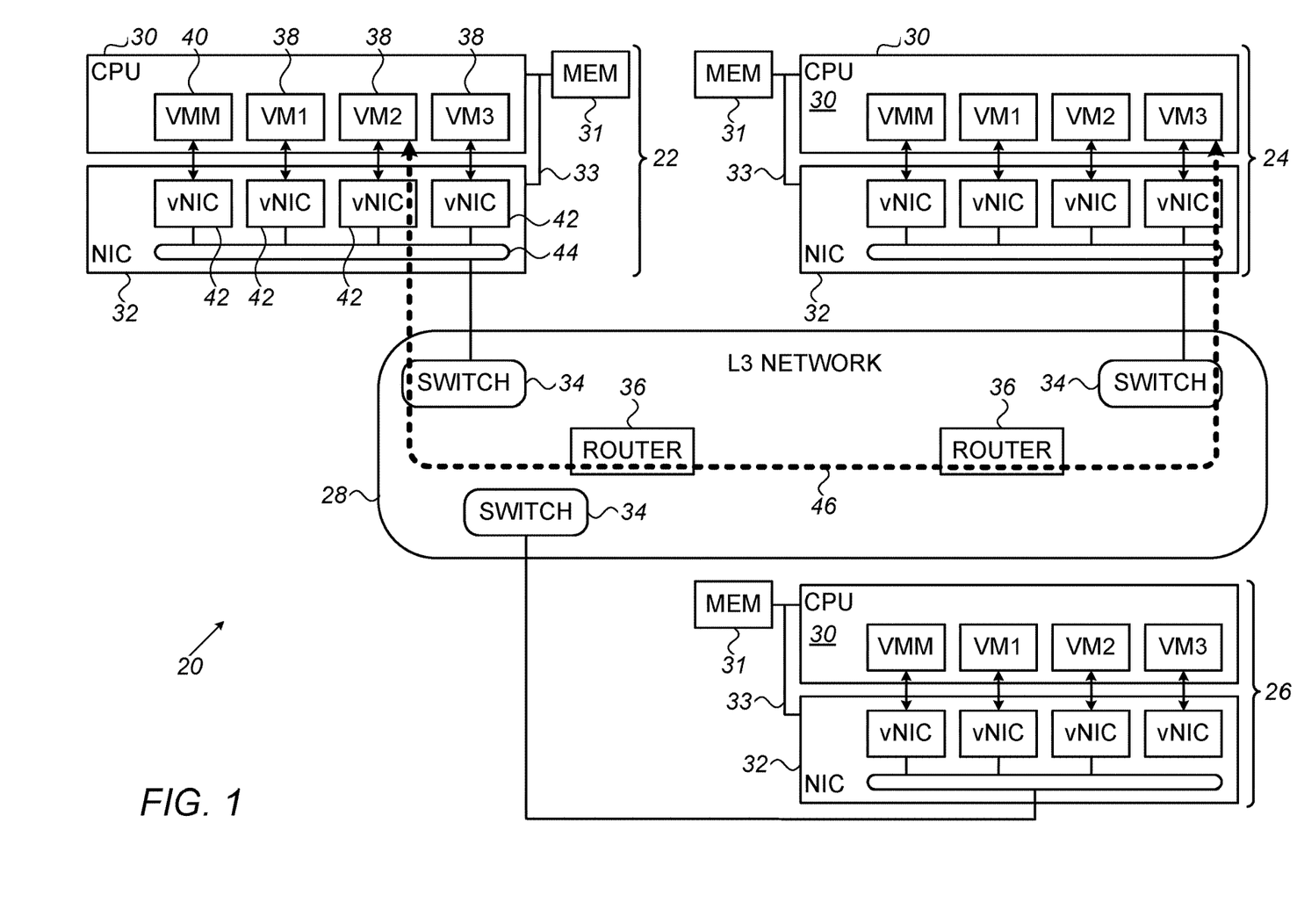
FIG. 1 is a block diagram that schematically illustrates a networked computer system, in accordance with an embodiment of the present invention.

FIG. 1 is a block diagram that schematically illustrates a networked computer system 20, in accordance with an embodiment of the present invention. System 20 comprises multiple host computers 22, 24, 26, . . . (also referred to simply as "hosts"), which communicate over a packet data network 28. Typically, although not necessarily, data network 28 is a Layer-3 network, such as an IP network, and thus comprises Layer-3 routers 36, as well as switches 34, through which hosts 22, 24, 26, . . . , may connect to the network. The principles of the present invention, however, are similarly applicable over other sorts of data networks, such as InfiniBand networks; and the methods and circuits described herein can be used to support various sorts of packet-level cryptographic security protocols, including both Layer-2 and Layer-3 protocols.

Each host 22, 24, 26 in this example comprises a central processing unit (CPU) 30, which typically comprises one or more processing cores (not shown), with a system memory 31 and a network interface controller (NIC) 32. NIC 32 is connected by a bus 33 to CPU 30 and memory 31, and is connected via one of switches 34 to network 28. Bus 33 may comprise, for example, a peripheral component bus, such as PCI Express® (PCIe®) bus, or a dedicated system bus of the CPU. A cryptographic security hardware logic module in NIC 32 can be invoked to apply a cryptographic security protocol, such as IPsec, to outgoing and incoming data packets to and from network 28, as described further hereinbelow.

Hosts 22, 24, 26 support a virtual machine environment, in which multiple virtual machines 38 (labeled VM1, VM2, VM3 in FIG. 1) may run on any given CPU 30. A virtual machine monitor (VMM) 40 in the CPU native domain interacts with the kernels of the guest operating systems of virtual machines 38 in a manner that emulates the host processor and allows the virtual machines to share the resources of the CPU.

NIC 32 comprises packet processing circuitry, which is configured to appear to the programs running on CPU 30 as multiple virtual NICs (vNICs) 42. In a model that is known as single-root I/O virtualization (SR-IOV), each virtual machine 38 interacts with NIC 32 as though the NIC was dedicated to that virtual machine, linking the virtual machine to other machines (virtual and/or physical) on network 28. In this regard, NIC 32 acts as a virtual switch, connecting each of the virtual machines to a particular tenant network while allowing vNICs 42 to share the same physical port to underlying data network 28.

This virtualization of NIC functions is also supported by offloading of IPsec functions from VMM 40 to NIC 32, as explained below in greater detail. In the example shown in FIG. 1, VM2 in host 22 and VM3 in host 24 reside on the same tenant network. In network virtualization systems that are known in the art, to send an IPsec packet to VM3, VM2 submits the packet to VMM 40 in host 22; and the VMM adds an AH, encapsulates the packet and transmits it to the VMM in host 24, which then authenticates, decapsulates, and passes the packet to VM3. By contrast, in the present embodiment, VM2 in host 22 communicates with VM3 in host 24 via an IPsec tunnel 46 between the respective NICs 32, without necessarily even being aware that IPsec authentication or encapsulation is taking place.

Figure 2:
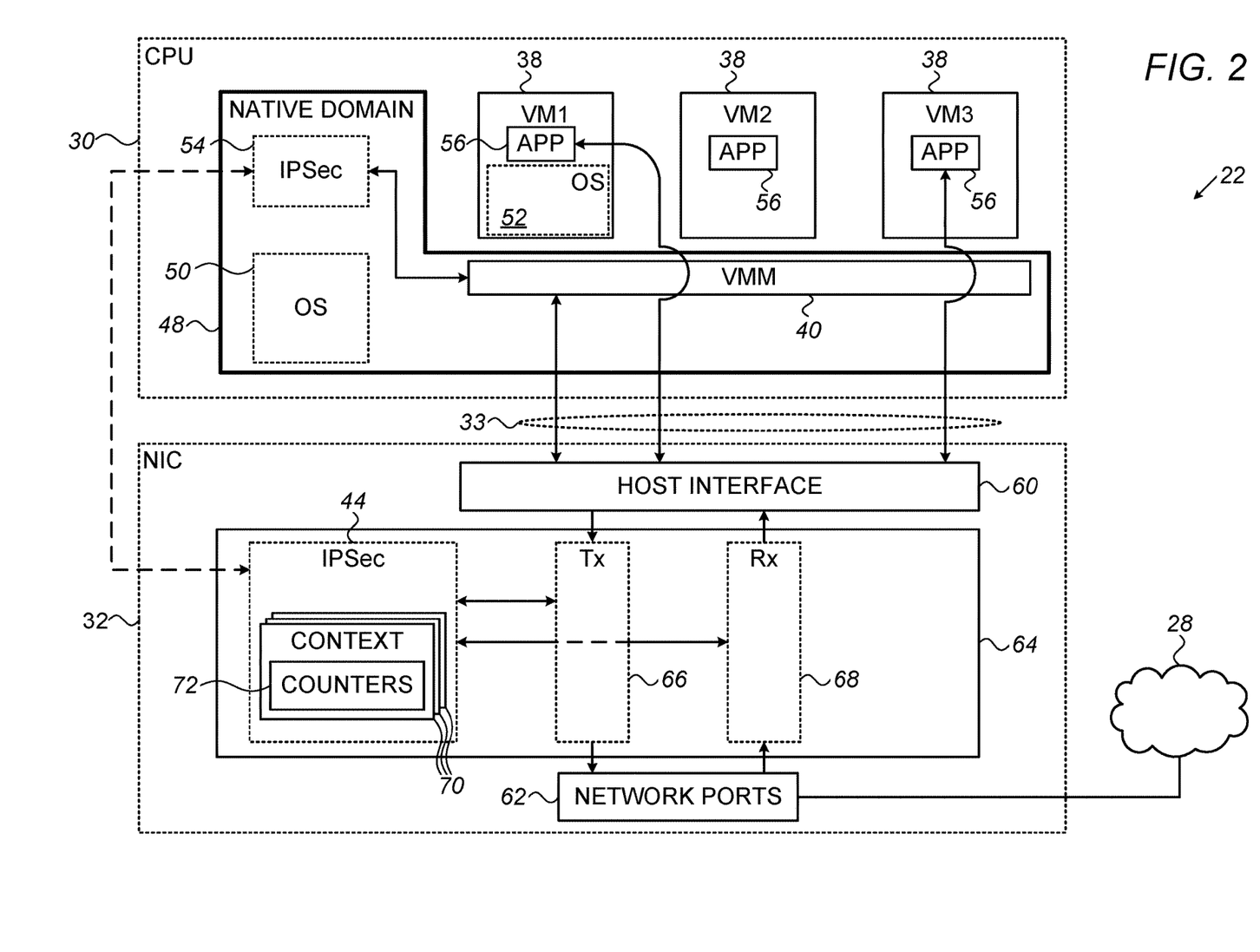
FIG. 2 is a block diagram that schematically shows details of a network interface controller (NIC) and software running on a host processor, in accordance with an embodiment of the present invention.

FIG. 2 is a block diagram that schematically shows details of NIC 32 and software running on CPU 30, in accordance with an embodiment of the present invention. The software running on CPU 30, including both operating system and application programs, may be downloaded to the CPU in electronic form, over a network for example. Additionally or alternatively, the software may be stored on tangible, non-transitory computer-readable media, such as optical, magnetic or electronic memory media, which may be embodied in memory 31.

CPU 30 operates a native domain 48, with a host operating system 50 and other privileged functions, including an IPsec software module 54. In addition, the CPU concurrently runs one or more virtual machines 38, as noted above, each with its own guest operating system 52 and guest user applications 56. (Only one guest OS is shown in FIG. 2 for the sake of simplicity.) VMM 40 in native domain 48 interacts with the kernels of guest operating systems 52 in a manner that emulates the host processor and allows the virtual machines to share the resources of CPU 30. A wide range of virtual machine software of this sort is available commercially, and further description is beyond the scope of the present disclosure.

Client processes, such as user applications 56, communicate with the transport layer of network 28 by manipulating a transport service instance, known as a "queue pair" (QP). To send and receive messages over the network using NIC 32, a client submits work items, called work queue elements (WQEs), to the appropriate queues for execution by the NIC. As illustrated in FIG. 1, NIC 32 appears to each virtual machine 38 to be a dedicated I/O device, or vNIC, for use by that virtual machine in communicating directly over its assigned virtualized tenant network. This configuration minimizes the burden of communication on VMM 40 and on host operating system 50.

NIC 32 comprises a host interface, such as a PCIe interface, which connects to bus 33 of host computer 22, and a network interface, comprising one or more ports 62 connected to network 28. Packet processing hardware logic in NIC 32 is coupled between host interface 60 and network ports 62 and comprises a transmit (Tx) pipe 66 and a receive (Rx) pipe 68, which transmit and receive data packets to and from network 28 in response to the WQEs posted by applications 56. Tx pipe 66 executes WQEs by composing packet headers, reading specified data from memory 31 into the packet payloads, and then transmitting the packets to network 28. Rx pipe 68 receives incoming packets, writes the packet data to memory 31, and notifies the destination application (for example by posting a completion queue item in an appropriate queue in memory 31), as well as returning acknowledgments over network 28 to the senders of the packets. These basic packet transmission and reception operations are well known in the art. Further details of the virtualization functions associated with NIC 32 are described, for example, in U.S. Pat. No. 9,462,047, whose disclosure is incorporated herein by reference.

Packet processing hardware logic 64 also comprises cryptographic security hardware logic module 44, which is configured, when invoked by IPsec software module 54, to apply IPsec security functions to the data packets transmitted and received by Tx pipe 66 and Rx pipe 68. These security functions typically include adding IPsec authentication headers to transmitted packets and using these headers to authenticate received packets and protect against replay attacks, as well as ESP encryption, decryption, encapsulation, decapsulation, and tunneling, as described in the above-mentioned RFCs.

Hardware logic module 44 can be introduced, for example, as a stage in flow steering within pipes 66 and 68. Such flow steering typically uses a packet steering table, containing steering instructions keyed by header field values, as described, for example, in U.S. Patent Application Publications 2013/0114599 and 2016/0359768, whose disclosures are incorporated by reference. The flow steering entries can indicate which flows are subject to IPsec handling and which IPsec operations should be applied to each flow.

The flow steering mechanism in pipes 66 and 68 is governed by flow steering entries that are configurable by software. Flow steering processing begins from a single flow steering root entry for Tx pipe 66 and another for Rx pipe 68. Flow steering entries are added to the root entry to form a flow steering tree, which is an acyclic graph. IPsec flow steering entries can specify one or more actions to be performed by hardware logic module 44, for example:

1. Encrypt/decrypt and authenticate.
2. Check replay protection against a replay-window.
3. Add/remove IPsec headers.

These functions can be combined to provide full IPsec offload, and can be interleaved with flow steering entries unrelated to IPsec, such as various header matching functions.

For example, in Rx pipe 68, the flow steering tree for a received packet could include the following sequence of entries and corresponding actions:

1. Check destination medium access control (MAC) address.
2. Check IP address.
3. Check Security Parameters Index (SPI) of IPsec ESP.
4. IPsec decryption and authentication.
5. Check and update IPsec replay protection.
6. Remove ESP header (decapsulate packet).
7. Parse packet following decapsulation.
8. Check IP address and drop if no match to existing list.
9. Check transport protocol port and drop if no match.
10. Apply high-level offload functions.

After all steering stages have been successfully completed, NIC 32 passes the packet to its destination process. In case of an exception in one of the IPsec processing stages, however, NIC 32 will pass the packet to VMM 40 for handling in software. On the other hand, if a packet does not satisfy the IPsec protection requirements dictated by the applicable security policy, NIC 32 will block the packet altogether.

In Tx pipe 66, security policy rules are included in the steering tree to select the entry in the SAD that is to be used for each outgoing packet flow, which in turn will determine whether the packet is to be referred to hardware logic module 44 for IPsec processing and, if so, which IPsec functions to apply. The SAD entry is selected for each packet depending on certain header fields, such as the IP header, a transport header, and/or an encapsulation header. Thus, the flow steering tree for an outgoing packet could include the following sequence of entries and corresponding actions:

1. Check destination MAC address.
2. Check IP address.
3. Check transport header.
4. Select SAD entry for this flow.
5. Add ESP header.
6. Encrypt and authenticate packet.

Alternatively, depending on the SAD entry that is selected at step 4, the steering logic in Tx pipe 66 may decide to bypass further IPsec processing or possibly to drop the packet.

More complex use cases can arise when other actions are combined with IPsec. For example, Rx pipe 68 can be directed by the flow steering entries to decapsulate and handle an IPsec packet that is encapsulated in a Virtual Extensible LAN (VXLAN) packet, or a VXLAN packet that is encapsulated inside an IPsec packet. Tx pipe 66 can similarly be directed to perform this sort of multi-level encapsulation.

Hardware logic module 44 maintains an IPsec state context 70 with respect to each of applications 56 or virtual machines 38 for which IPsec software module 54, under the control of VMM 40, has invoked IPsec services. If module 44 is required to handle a large number of packet flows, state context data can be stored in memory 31 and cached in NIC 32 as needed. Context 70 contains an SA database, which holds keys and encryption parameters for use in authenticating and encapsulating packets. Typically, context 70 also includes counters 72, which keep track of packet serial numbers, replay protection windows, and numbers of transmitted bytes and/or packets, as required by the IPsec protocol. Further details of the information maintained in context 70 can be found in the above-mentioned RFC 4301.

Upon encountering an exception in applying the mandated IPsec processing to a given packet (or flow of packets) to or from a given virtual machine 38 or application 56, hardware logic module 44 transfers the packet or flow to IPsec software module 54 for further handling. Hardware logic module 44 also transfers the corresponding state context 70 for the given virtual machine or application to software module 54. VMM 40 uses this state context in software module 54 to continue processing the packet or flow, in a manner that is transparent to the virtual machine or application.

In some embodiments, after VMM 40 has resolved the exception, hardware logic module 44 continues handling subsequent packets in the flow. Alternatively, after the VMM has handled the exception, all further offload of this flow (or specifically, handling of this IPsec SA) is terminated, and all subsequent packets in this flow are processed completely by the VMM. In some cases, such as exceptions encountered in non-initial IP fragments, such termination is only possible after fully handling the exception to allow correct identification of the flow.

Handling Of Exceptions

As explained above, when hardware logic module 44 encounters an exception in applying the required IPsec operations to a data packet that is directed to a given virtual machine 38, the hardware logic module transfers the data packet, together with IPsec state context 70 with respect to the given virtual machine, to IPsec software module 54. This software module processes the data packet using the state context and passes the data packet, after processing, to the given virtual machine while updating the state context (including replay protection data and sequence numbers, for example). One example of this sort of process with respect to a fragmented packet will be described below with reference to FIG. 3.

Similar sorts of handovers from hardware to software take place in other cases of states and rules that are too complex for hardware logic module 44 to maintain and identify, such as complex firewall rules. For example, an exception may occur when a certain VM 38 asks NIC 32 to transmit a packet that is too large to be transmitted after encapsulation, and IP fragmentation is needed. Hardware logic module 44 identifies this exception after encryption, authentication and encapsulation and passes the packet to VMM 40 for retransmission after fragmentation.

As another example, hardware logic module 44 may encounter an exception when a packet that should be encrypted is transmitted before any cryptographic information has been configured for handling this packet. VMM 40 will take over and perform a handshake to configure the cryptographic information after receiving this packet.

Figure 3:
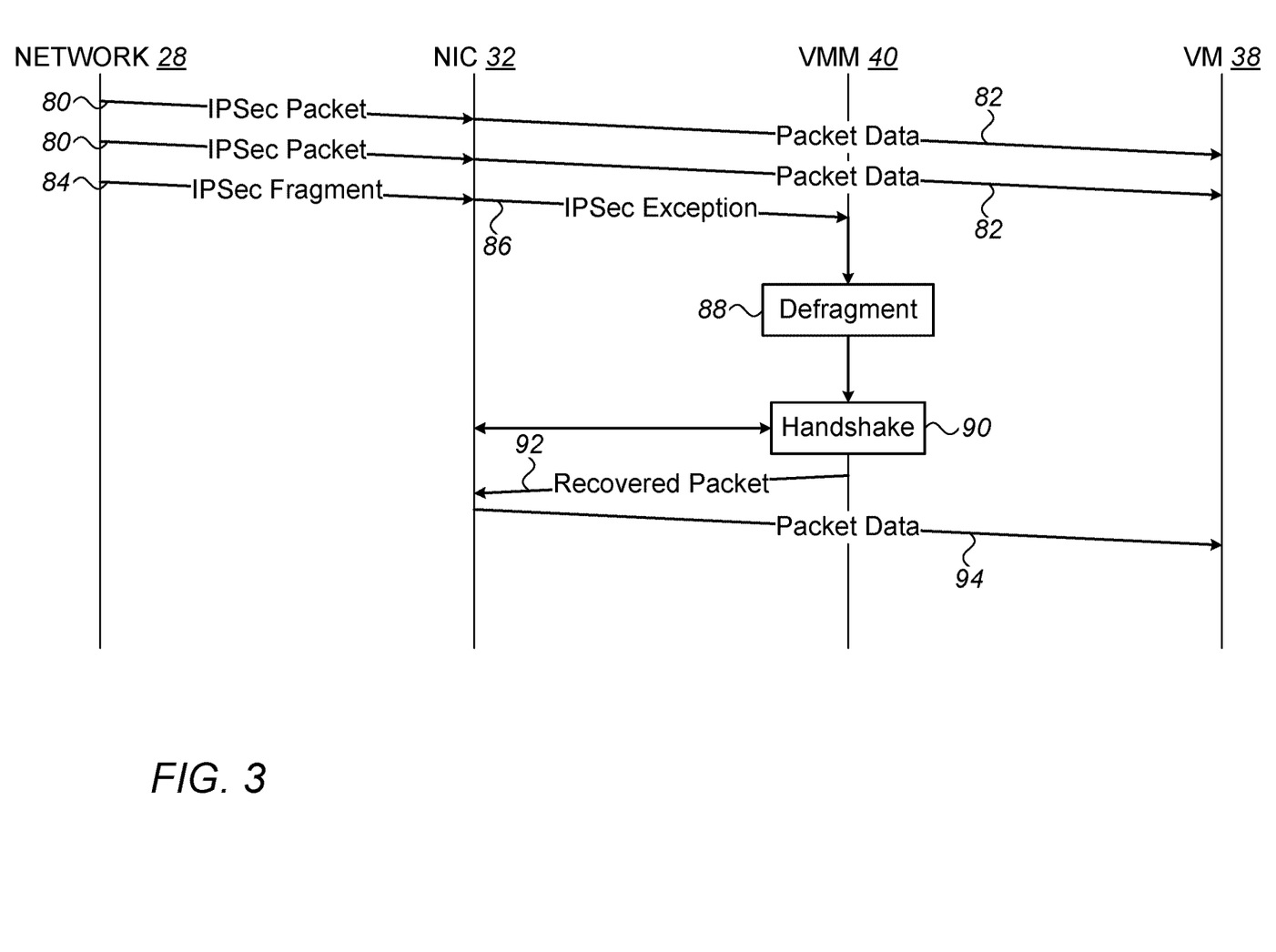
FIG. 3 is a ladder diagram showing communications exchanged between a NIC and software running on a host processor, in accordance with an embodiment of the invention.

FIG. 3 is a ladder diagram showing communications exchanged between NIC 32 and software running on CPU 30, in accordance with an embodiment of the invention. Actions taken by VMM 40 in this description include functions carried out by IPsec software module 54. In normal operation, NIC 32 receives IPsec packets 80 from network that are destined for a given VM 38, and processes packets 80 in hardware logic module 44 to authenticate and decapsulate the packets as appropriate. NIC 32 then writes corresponding packet data 82 to memory 31 and notifies the appropriate VM 38. As noted earlier, the VM is uninvolved in IPsec functions and may be unaware that such functions are even being applied to packets that the VM transmits and receives.

When NIC 32 receives an IPsec fragment 84, however, hardware logic module 44 recognizes that the packet has been fragmented and notifies VMM 40 that an exception 86 has occurred. (This sort of fragmentation can occur, for example, when the sender of the packet, such as host 24, applied IPsec authentication and/or encapsulation to a large packet, and one of routers 36 broke the original large packet into smaller IP packets for transmission on to host 22.) Specifically, NIC 32 typically writes packet fragments to memory 31 for handling by software and places an event report in a queue for handling by VMM 40. Upon receiving and parsing the event report, VMM 40 reads and reassembles the pieces of the original packet from the fragments in memory 31, at a defragmentation step 88.

Figure 4:
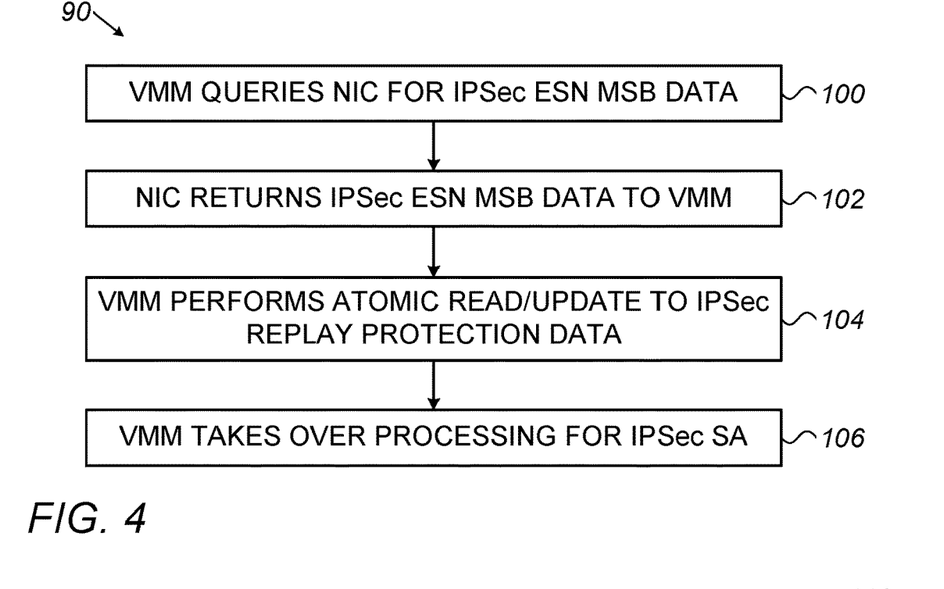
FIG. 4 is a flow chart that schematically illustrates a method for performing a security-related handshake between a NIC and a virtual machine monitor (VMM), in accordance with an embodiment of the invention.

In addition, IPsec software module 54 carries out a handshake 90 with hardware logic module 44 in order to retrieve and update the parameters in state context 70 that are needed in order to process the defragmented packet. Details of handshake 90 are shown in FIG. 4. Handshake 90 can take place concurrently with or before defragmentation step 88, rather than after defragmentation as shown in FIG. 3.

Once IPsec software module 54 has completed defragmentation step 88 and handshake 90, it is able to carry out the required IPsec processing operations on the received packets. As part of the handshake, NIC 32 passes the current IPsec extended sequence number (ESN) to VMM 40, for use in decrypting the defragmented packet data. (Assuming the decryption is successful, VMM 40 updates context information used by hardware logic module 44 in replay protection, and module 44 is thus able to continue processing subsequent packets in this flow.) After completion of the IPsec processing, VMM 40 then passes the processed data packet to the destination VM 38 by looping the processed data packet through NIC 32. In other words, VMM 40 writes a recovered packet 92 to NIC 32 as though it were transmitting the packet over network 28 to any destination VM. NIC 32 applies its usual SR-IOV virtual switching functionality to recovered packet 92 in order to write corresponding packet data 94 to VM 38. Thus, VM 38 remains unaware of the chain of IPsec processing and exception handling that was applied.

FIG. 4 is a flow chart that schematically shows details of handshake 90, in accordance with an embodiment of the invention. As explained above, when NIC 32 encounters an exception in IPsec handling of a given packet or flow, VMM 40 uses this handshake to acquire IPsec state context 70 with respect to the VM 38 to which the packet or flow is destined. The steps in the handshake are carried out by reading and writing instructions and data between VMM 40 and NIC 32 over bus 33. FIG. 4 shows one example of such a handshake, but alternative implementations can also be used, depending on the protocol and the context information that is exchanged.

VMM 40 (or IPsec software module 54) queries NIC 32 for packet sequence number information that is used in IPsec processing, at a query step 100. For example, VMM 40 may request the most significant bits (MSB) of the IPsec extended sequence number (ESN), which are needed for authentication and decryption of received packets. NIC 32 returns this information from IPsec state context 70 to VMM 40, at a query response step 102.

VMM 40 also performs atomic read and update operations on replay protection information used in IPsec, at an atomic update step 104. This step fixes the value of the sliding window that is used in IPsec to prevent replay attacks, and thus ensures that VMM 40 will pass no replayed packets to VM 38. Once the handshake is complete, VMM 40 takes over processing the exception that has occurred (for example, packet fragmentation) in this IPsec SA, at a handover step 106. VMM 40 updates IPsec state context 70, thus enabling hardware logic module 44 in NIC 32 to continue processing subsequent packets in the flow.

As another example (not shown explicitly in the figures), hardware logic module 44 in NIC 32 can apply IPsec ESP encapsulation, decapsulation and tunneling to outgoing and incoming packets, using the appropriate state context 70 for each virtual machine 38. In accordance with IPsec requirements, module uses counters 72 to maintain counts of data transferred using a given SA, for example, data transmitted or received through a particular IPsec tunnel. When the count reaches a predefined limit, NIC 32 will stop transmitting or receiving the data packets and will transfer the corresponding state context 70 to VMM 40 for update of the state context. At this stage, VMM 40 may negotiate a new SA over network 28 with a remote host, whereupon the ESP operations can resume.

As another example, hardware logic module 44 in NIC 32 may decapsulate incoming packets from network 28 using state context 70. Upon receiving instructions from VMM 40 to terminate the decapsulation, NIC 32 can loop the received data packets back to network 28, and may also perform additional IPsec functions on the outgoing packets.

Alternative Embodiment—Smart NIC

Figure 5:
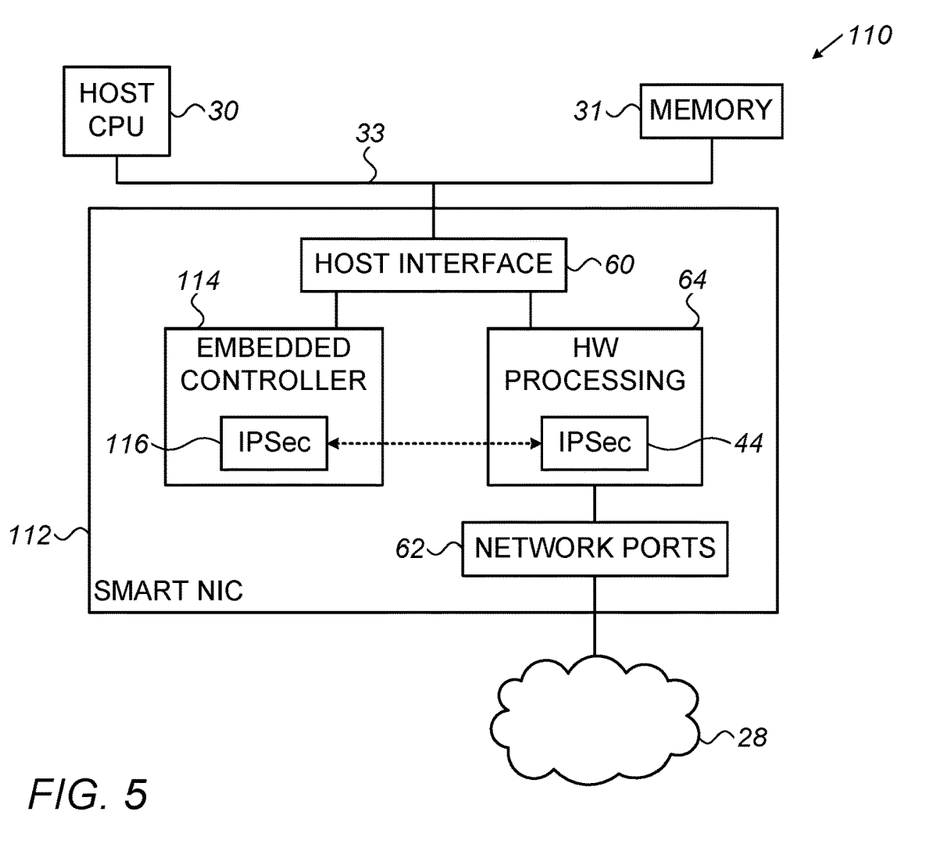
FIG. 5 is a block diagram that schematically illustrates a host computer with a NIC having an embedded controller, in accordance with an embodiment of the invention.

FIG. 5 is a block diagram that schematically illustrates a host computer 110 with a "smart NIC" 112 comprising an embedded controller 114, in accordance with an embodiment of the invention. This embodiment handles IPsec offload in similar fashion to the embodiments described above, except that IPsec hardware logic module 44 in NIC 112 interacts with an IPsec software module 116 running on embedded controller 114, rather than on CPU 30. The features of IPsec offload with transfer of state context to an IPsec software module that were described above with reference to NIC 32 and VMM 40 can likewise be applied, mutatis mutandis, in smart NIC 112. Applications and virtual machines running on CPU 30 in computer host 110 can similarly be unaware of the IPsec functions applied by NIC 112.

As in the preceding embodiments, NIC 112 comprises network ports 62, connected to network 28, and host interface 60, connected to bus 33 of computer 110. Packet processing hardware logic 64 is coupled between host interface 60 and network ports 62 so as to transmit and receive data packets over the network from and to the applications running on CPU 30. IPsec hardware logic module 44, when invoked by embedded controller 114, applies IPsec processing to the data packets transmitted and received by one or more of the applications running on the CPU, while maintaining an IPsec state context (as shown in FIG. 2) with respect to each of these applications.

In the present embodiment, IPsec software module 116 running on embedded controller 114 is configured to apply IPsec processing and to invoke hardware logic module 44 as appropriate. When hardware logic module 44 encounters an exception in applying IPsec to a data packet directed to a given application, module 44 transfers the data packet, together with the corresponding IPsec state context, to IPsec software module 116. Embedded controller 114 then processes the data packet using the state context and passes the data packet, after processing, to the given application on CPU 30.

Although the features of computers 22 and 110 were described above specifically with reference to IPsec, the hardware and software architectures and methods of operation of these computers can similarly be applied, mutatis mutandis, in offload of other cryptographic security protocols. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computing apparatus, comprising:
   a host processor, which is configured to run a virtual machine monitor (VMM), which supports a plurality of virtual machines running on the host processor, and which comprises a cryptographic security software module configured to apply a cryptographic security protocol to data packets transmitted and received by one or more of the virtual machines; and
   a network interface controller (NIC), which is configured to link the host processor to a network so as to transmit and receive the data packets from and to the virtual machines over the network, and which comprises a cryptographic security hardware logic module, which is configured, when invoked by the VMM, to apply the cryptographic security protocol to the data packets transmitted and received by the one or more of the virtual machines while maintaining a state context of the cryptographic security protocol with respect to each of the one or more of the virtual machines,
   wherein the NIC is configured, upon encountering an exception in applying the cryptographic security protocol to a particular data packet directed to a given virtual machine, to transfer the particular data packet, together with the state context of the cryptographic security protocol with respect to the given virtual machine, to the cryptographic security software module of the VMM, which processes the particular data packet using the state context and passes the particular data packet, after processing, to the given virtual machine.

2. The apparatus according to claim 1, wherein the VMM is configured to apply the cryptographic security protocol and to invoke the cryptographic security hardware logic module without involvement by the virtual machines in invocation or implementation of the cryptographic security protocol.

3. The apparatus according to claim 1, wherein the VMM is configured, when the NIC has encountered the exception, to acquire the state context of the cryptographic security protocol with respect to the given virtual machine by performing a predefined handshake with the NIC.

4. The apparatus according to claim 3, wherein the predefined handshake comprises querying and receiving packet sequence number information from the NIC and updating replay protection information used in the cryptographic security protocol.

5. The apparatus according to claim 1, wherein the exception comprises a fragmentation of the particular data packet following application of the cryptographic security protocol by a sender of the particular data packet, and wherein the VMM is configured to defragment the particular data packet.

6. The apparatus according to claim 1, wherein the VMM is configured, after processing the particular data packet, to pass the processed data packet to the given virtual machine by looping the processed data packet through the NIC to the given virtual machine.

7. The apparatus according to claim 1, wherein the NIC is configured to apply an encapsulation, using the state context of the cryptographic security protocol, to the data packets transmitted from the given virtual machine to a specified destination, while maintaining a count of the data transmitted using the state context, and when the count reaches a predefined limit, to stop transmitting the data packets to the specified destination and transfer the state context to the cryptographic security software module of the VMM for update of the state context.

8. The apparatus according to claim 1, wherein the NIC is configured to apply a decapsulation, using the state context of the cryptographic security protocol, to encapsulated data packets received from the network, and upon receiving instructions from the VMM to terminate the decapsulation, to loop the received data packets back to the network.

9. The apparatus according to claim 1, wherein the cryptographic security protocol comprises an IPsec protocol.

* * * * *